United States Patent [19]
Dubois et al.

[11] 3,989,354
[45] Nov. 2, 1976

[54] NEMATIC LIQUID CRYSTAL OF HOMEOTROPICALLY ALIGNED TYPE AND A METHOD OF MANUFACTURING SAID DEVICE

[75] Inventors: Jean Claude Dubois; Maryse Gazard; Annie Zann, all of Paris, France

[73] Assignee: Thomson-CSF, Paris, France

[22] Filed: Oct. 18, 1974

[21] Appl. No.: 516,020

[30] Foreign Application Priority Data
Oct. 19, 1973 France .............................. 73.37360

[52] U.S. Cl. .............................. 350/160 LC; 428/1; 252/299
[51] Int. Cl.² .......................... G02F 1/16; G02F 1/13
[58] Field of Search ................ 350/160 R, 160 LC; 117/211, 218; 428/1; 252/299

[56] References Cited
UNITED STATES PATENTS

| 3,063,872 | 11/1962 | Boldebuck | 117/218 X |
| 3,809,456 | 5/1974 | Goldmacher et al. | 350/160 LC |
| 3,854,793 | 12/1974 | Kahn | 350/160 LC |

*Primary Examiner*—Robert J. Webster
*Attorney, Agent, or Firm*—Cushman, Darby & Cushman

[57] ABSTRACT

A nematic liquid crystal device for electro-optical display devices, is provided. Its long-shaped molecules are orientated perpendicularly to the electrode plates delimiting the crystalline liquid, i.e. homeotropically aligned. A polymer layer with long-chain molecules has been previously formed on the internal faces of each plate separately arranged on a discharge electrode of an electrical apparatus operating at high frequency (13.56 mc/s) and containing a vapour at very low pressure of a monomer such as hexamethyldisiloxane. The molecules of polymer thus formed are perpendicular to the plates and a similar orientation of the liquid crystal molecules result from that, i.e. a homeotropic alignment.

3 Claims, 2 Drawing Figures

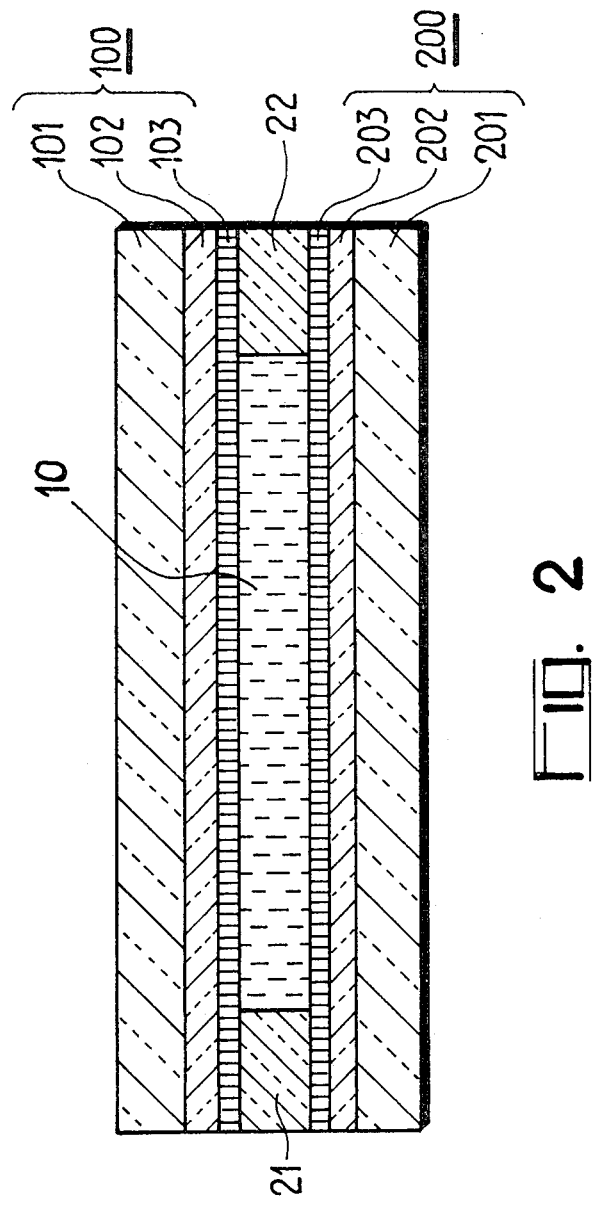

NEMATIC LIQUID CRYSTAL OF HOMEOTROPICALLY ALIGNED TYPE AND A METHOD OF MANUFACTURING SAID DEVICE

This specification relates to a nematic crystal device of homeotropically aligned type, and the method of manufacturing such a device. It relates in particular to devices used in display systems employing the dynamic scatter effect encountered in nematic liquid crystals.

Those skilled in the art will know that in the kinds of liquid crystals used for display purposes, a droplet of liquid crystal is located between the flat and parallel surfaces of two transparent electrodes; if the liquid crystal involved is one which is in the nematic phase, the long-shaped molecules of the liquid can be given a common orientation. For example, in the case of "planar" alignment, the molecules are orientated parallel to the planes of the electrodes. In the case of "homeotropic alignment, they are disposed perpendicularly to said parallel planes. The result is that different optical properties are produced, which can be utilised in different display systems.

Methods of producing liquid crystals orientated in accordance with these two types of alignment, are known which are based upon the depositing of a layer of a surfactant on the internal face of each of the electrodes. The surfactant will for example be a silanol polymer (R Si $O_3H_3$, where R is an organic radical) or a long-chain quaternary ammonium. The method of preparation has recourse to rudimentary methods such as dipping and ovenbaking, but the layer thus formed generally exhibits defects of purity and uniformity which impair the performance of the liquid crystal device produced by this method. The invention overcomes these drawbacks.

According to the present invention, there is provided a liquid crystal device of homeotropically aligned type, comprising two plane parallel and transparent electrodes and, between them, in a parallel arrangement, a first layer of an organic substance comprising long-chain molecules orientated perpendicularly to the parallel planes of said electrodes, a second layer made of a crystalline liquid substance of nematic type, and a third layer made of the same substance as said first layer.

The invention will be better understood and other of its features rendered apparent from a consideration of the ensuing description and the accompanying drawings of which:

FIG. 2 is a transverse section through an embodiment of the invention.

Figure 1:
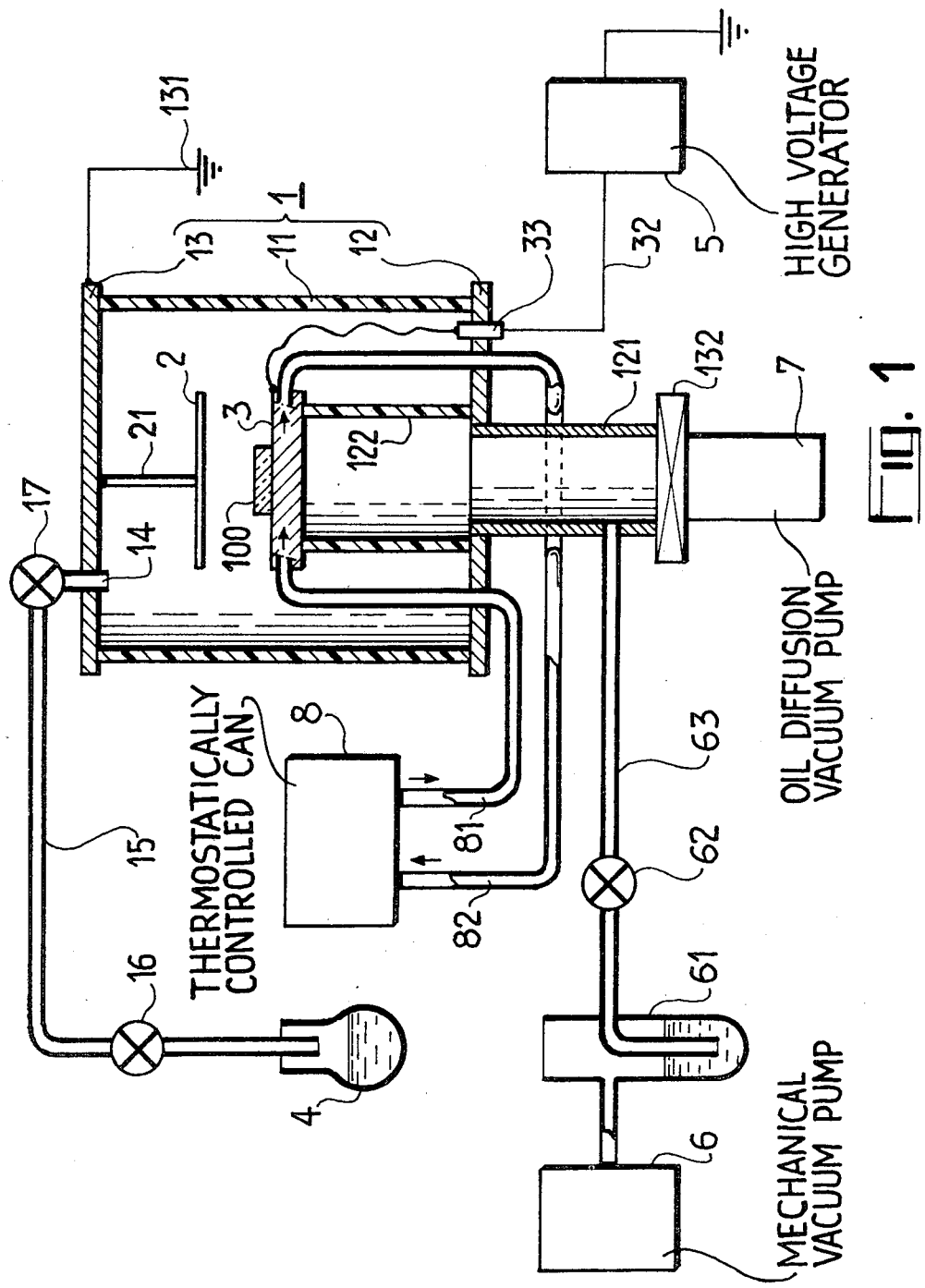
FIG. 1 is an example of an apparatus for achieving the result proposed in accordance with the invention.

The principle of manufacture of a device in accordance with the invention is as follows. Starting from a monomer vapour at very low pressure an ionic plasma is formed in an apparatus having two electrodes between which a high potential difference is applied. The plasma ions are attracted in a preferential way to one of the electrodes and form a deposit on it. If a glass plate with parallel face is arranged on the surface of depositing electrode, then upon said plate an orientated polymer layer is produced. It has been proven by X-ray analysis that this layer contains long-chain molecules whose axes are perpendicular to the surface of the plate. If certain monomers such as hexamethyldisiloxane are used, then a polymer layer is obtained whose orientated molecules are capable, in turn and by their influence, of orientating the molecules of a crystalline liquid in the nematic phase placed in contact with them. This property is utilised by depositing the polymer no longer on a simple glass plate, but on an "electrode" of a liquid crystal device.

FIG. 1 illustrates an example of an apparatus for achieving the result in accordance with the invention. An evacuated enclosure 1 comprises a cylindrical sleeve 11 of electrically insulating material, resting upon a horizontal base 12. A cylindrical sleeve of metal, 121 opens into the centre of the base 12 to enable the enclosure to be pumped and evacuated. A cover 13 which is electrically conductive, caps the vessel formed by the sleeve 11 and the base 12. It is traversed by a tube 14 of glass, having a much smaller diameter than the sleeve 121. A first metal electrode 2 is fixed under the cover 13, parallel to the base of the vessel, by means of a conducting rod 21 welded to the centre of the cover 13. The latter has an earth connection 131.

Beneath electrode 2 and parallel to it, there is arranged a metal electrode 3 containing a cooling coil (not shown) through which silicon oil at 20° C coming from a thermostatically controlled can 8, and following the lines 81 and 82, circulates. This electrode 3 is carried by an insulated sleeve 122 having a diameter greater than that of the sleeve 121. It is supplied with the high voltage produced by a generator 5, through a connecting cable 32 supplying a sealed lead through 33 arranged across the base 12. The generator 5 is of the direct high voltage kind (1000 volts for example) or of the radio frequency kind (13.56 mc/s). This second solution is preferable either for the deposition on the electrode 3 of a layer having a thickness greater than 2000 Angstroms units, or for the production of a layer of uniform thickness on a substrate comprising parts which are electrically conductive and parts which are electrical insulators, placed on the electrode 3.

The production of the primary vacuum is effected by means of a mechanical vacuum pump 6 through a liquid nitrogen trap 61 to the sleeve 121 via a line 63 containing a flow gate 62.

The secondary vacuum is produced by an oil diffusion vacuum pump 7 arranged beneath the sleeve 121 with an intervening screen gate 132. The supply of monomer vapour is effected from a flask 4 through a line 15 containing gates 16 and 17, the latter connected to the tube 14.

The mode of operation is as follows:

On the electrode a plate 100 is arranged whose structure, in the case of the invention, will be described hereinafter and which is destined to receive the polymer deposit. After closing the gates, other than the gate 62, the primary vacuum is developed by the pump 6. Then, the gate 62 is closed, the gate 132 opened and the secondary vacuum developed by the pump 7. The gate 132 is closed and the gate 17 opened, the gate 16 being opened to the minimum extent to allow the monomer vapour to enter. The primary pump is restarted in order to maintain a low-pressure (between 1/100 mmHg and 1 mmHg) vapour current through the gates 16 and 17, the vessel 1, the gate 62 and the nitrogen trap 61. The electrical discharge is started by starting the generator 5. A polymer deposit forms preferentially on the electrode 3. In the case of the high frequency generator, at a power of some few watts (with electrodes 3 centimeters in diameter) a highly crosslinked polymer layer, with very good long term stability which is resistant to organic solvents and withstands attack by acids or basic solutions, is obtained.

FIG. 2 illustrates an example of a nematic liquid crystal device in accordance with the invention comprising two plates 100 and 200 arranged at a fixed interval by the provision of spacers 21 and 22 of transparent material (plastic film for example). Each of the plates is constituted by a plate proper, of glass, 101 (or 201) covered with a first layer 102 (202) of stannic oxide which is transparent and which has good electrical conductivity, playing the part of electrode, and a polymer layer 103 (203) playing the part of orientating layer. The plates are arranged in such a fashion that the layers 103 and 203 are in contact with the liquid crystal layer trapped between the plates and the spacers. In the case where, in accordance with the invention, a polymer layer made up of one of the following substances is used:

a siloxane such as hexamethyldisiloxane;
a silane such as vinyltrimethylsilane;
a carbon-chain organic substance with one or two functional groups, such as 1,7 dicyanoheptane;

an excellent orientating effect is produced and is effective in the liquid 10 for a polymer thickness of some few hundreds of angstrom units, in particular with a liquid crystal of the formula:

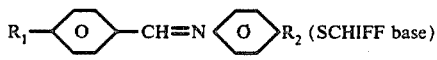

where $R_1$ and $R_2$ are alkyl or alkoxy radicals. In particular, excellent results are achieved with 4-methoxybenzylidene-4'-butylaniline. Acceptable results are also obtained with nematic liquid crystals constituted by benzoic esters or tolanes.

What we claim is:

1. A liquid crystal device of homeotropically aligned type, comprising two plane parallel and transparent electrodes and, between them, in a parallel arrangement, a first layer of hexamethyldisiloxane polymer formed by deposition by means of electrical discharge in a vapour phase, a second layer made of a crystalline liquid substance of the Schiff base group, and a third layer made of the same substance as the first layer.

2. A liquid crystal device of homeotropically aligned type, comprising two plane parallel and transparent electrodes and, between them, in a parallel arrangement, a first layer of vinyltrimethylsilane polymer formed by deposition by means of electrical discharge in a vapour phase, a second layer made of a crystalline liquid substance of the Schiff base group, and a third layer made of the same substance as the first layer.

3. A liquid crystal device of homeotropically aligned type, comprising two plane parallel and transparent electrodes and, between them, in a parallel arrangement, a first layer of 1–7 dicyanoheptane polymer formed by deposition by means of electrical discharge in a vapour phase, a second layer made of a crystalline liquid substance of the Schiff base group, and a third layer made of the same substance as the first layer.

* * * * *